(12) United States Patent
Kim et al.

(10) Patent No.: US 8,804,857 B2
(45) Date of Patent: Aug. 12, 2014

(54) SIGNAL PROCESSING METHOD FOR TERRESTRIAL REPEATER

(75) Inventors: Hee-Wook Kim, Daejeon-si (KR); Soo-Young Kim, Daejeon-si (KR); Bon-Jun Ku, Daejeon-si (KR); Do-Seob Ahn, Daejeon-si (KR)

(73) Assignees: Electronics and Telecommunications Research Institute, Daejeon (KR); Industrial Cooperation Foundation Chonbuk National University, Jeonju (KR)

( * ) Notice: Subject to any disclaimer, the term of this patent is extended or adjusted under 35 U.S.C. 154(b) by 291 days.

(21) Appl. No.: 13/284,147

(22) Filed: Oct. 28, 2011

(65) Prior Publication Data

US 2012/0106598 A1 May 3, 2012

(30) Foreign Application Priority Data

Nov. 1, 2010 (KR) .......................... 10-2010-0107800

(51) Int. Cl.
*H04L 27/00* (2006.01)

(52) U.S. Cl.
USPC ........................... 375/259; 375/214; 455/12.1

(58) Field of Classification Search
USPC ......... 375/211, 214, 259, 261–262, 268, 279, 375/341; 370/274, 226, 315; 455/7, 10, 455/12.1, 11.1

See application file for complete search history.

(56) References Cited

U.S. PATENT DOCUMENTS

| 5,628,049 | A | * | 5/1997 | Suemitsu | 455/11.1 |
| 5,937,332 | A | | 8/1999 | Karabinis | |
| 6,327,316 | B1 | * | 12/2001 | Ikeda | 375/341 |
| 2003/0191695 | A1 | * | 10/2003 | Kondo et al. | 705/26 |
| 2013/0121430 | A1 | * | 5/2013 | Anderson et al. | 375/260 |

OTHER PUBLICATIONS

Christophe Selier, et al. "Satellite Digital Multimedia Broadcasting (SDMB) system presentation" IST SUMMIT, paper 223, 2005, pp. 1-5.
Youngmin Kim, et al. "Layered Turbo Codes Combined with Space Time Codes for Satellite Systems" Published Paper, 2010 Joint Conference on Satellite Communications, JC-SAT Oct. 28-29, 2010, pp. 1-6.

* cited by examiner

*Primary Examiner* — Jean B Corrielus
(74) *Attorney, Agent, or Firm* — Staas & Halsey LLP (57) ABSTRACT

A signal processing technology for allowing a repeater to transmit a signal received from an external apparatus to a terminal is provided. In a satellite system, a signal transmitted from a satellite or transmitted to a satellite is subject to a low order modulation, and a terrestrial repeater performs a high order modulation on signals and retransmits the signals.

14 Claims, 6 Drawing Sheets

SIGNAL PROCESSING METHOD FOR TERRESTRIAL REPEATER

CROSS-REFERENCE TO RELATED APPLICATION

This application claims the benefit under 35 U.S.C. §119(a) of Korean Patent Application No. 10-2010-0107800, filed on Nov. 1, 2010, the disclosure of which is incorporated by reference in its entirety for all purposes.

BACKGROUND

1. Field

The following description relates to a signal processing technology of a terrestrial repeater that transmits a satellite signal to a user terminal.

2. Description of the Related Art

In recent years, with the development of the communication technology, a satellite communication system has been developed to provide a user terminal on the move with various types of signals such as video data and audio data through a satellite.

Satellite communication and broadcast services basically require a line of sight (LOS) environment, and a user terminal may have a difficulty in directly receiving a satellite signal due to a shadow phenomenon in a urban area. For this reason, a terrestrial reaper is used.

As an example of satellite communication system using a repeater, a Digital Multimedia Broadcasting (DMB) developed in Korea and a Satellite-Digital Multimedia Broadcasting (S-DMB) developed in Europe have been proposed. A repeater in the Korea DMB is defined as a gap filler, and a repeater in the Europe S-DMB is defined as an Intermediate Module Repeater (IMR).

The repeater implemented in the current satellite communication system is divided into a simple amplification repeater and a frequency conversion repeater. The simple amplification repeater amplifies a received satellite signal on the same frequency and relays the amplified signal to a user terminal. The frequency conversion repeater performs a frequency conversion and amplification on a received satellite signal and relays the signal to the user terminal.

As described above, conventional terrestrial repeater is implemented to perform simple frequency conversion and signal amplification. However, in recent years, there are provided technologies in which various types of additional functions are added to the conventional terrestrial repeater to provide improved performance and services. In particular, there is a technology in which a terrestrial repeater performs an additional signal processing using additional error correction code (ECC) and Space-Time Code (STC) and thus a terminal combines a satellite signal to a signal that is processed in a repeater to obtain a diversity gain.

As described above, in the satellite communication system, a user terminal may directly receive from a satellite directly or may indirectly receive through multiple repeaters from a satellite directly. A signal directly received from the satellite and a signal received through the repeaters may go through different channel environments while reaching the terminal. In this condition, the terminal may improve the reception performance by use of the diversity technology for receiving multiple signals from the satellite and the repeaters simultaneously.

In addition, the satellite transmits information to the terrestrial repeater in a high order modulated symbol, and transmits information to the user terminal in a low order modulated symbol. In this case, if the terminal has a capability to receive the signal from the terrestrial repeater, the terminal has high quality of services, if the terminal can only receive the satellite signal, the terminal has basic quality of services.

There is a need for maximizing the frequency utilization by enhancing the efficiency of spectrum in consideration of the service providing environment by each of the terrestrial repeater and the satellite.

SUMMARY

In one aspect, there is provided a technology for a satellite system in which a signal transmitted from a satellite or transmitted to a satellite is subject to a low order modulation, and a terrestrial repeater performs a high order modulation on signals and retransmits the signal.

In a satellite system, a high order modulation is used and thus the efficiency of spectrum is enhanced.

In one aspect, there is provided a signal processing method for allowing a repeater to transmit a signal received from an external apparatus to a terminal, the method including: at the external apparatus, transmitting a modulated signal, which is modulated in the form of a low order modulation symbol including basic information bits, to the terminal or the repeater; at the is repeater, generating a modulated signal, which is modulated in the form of a high order modulation symbol including the basic information bits, which is recovered from the modulated signal received from the external apparatus, and additional information bits and transmitting the generated signal to the terminal; and at the terminal, recovering information by combining or selecting the signal received from the external apparatus or the signal received from the repeater.

The method may further include: at the external apparatus, receiving a modulated signal, which is modulated in the form of a low order modulation symbol including basic information bits.

In the transmitting of the modulated signal from the external apparatus to the terminal or the repeater, the external apparatus may transmit a modulated signal, which is modulated in the form of a low order modulation symbol including basic information bits consisting of systematic information (s) and some parity information (pi) using an error correction code.

In the transmitting of the modulated signal from the external apparatus to the terminal or the repeater, the external apparatus may transmit a modulated signal, which is modulated in the form of a low order modulation symbol including basic information bits comprising a basic layer using a Scalable Video Coding (SVC).

The transmitting of the generated signal from the repeater to the terminal may include: recovering the basic information bits by demodulating the signal that is received from the external apparatus; adding the additional information bits to the recovered basic information bits; and generating a modulated signal, which is modulated in the form of a high order modulation symbol including the basic information bits and the additional information bits.

The transmitting of the generated signal from the repeater to the terminal may further include: performing a delay compensation processing on the generated signal based on propagation delay in comparison with a signal transmitted from the external apparatus.

In the adding of the additional information bits, additional information bits may consist of a predetermined parity information (p) using an error correction code is added to the recovered basic information bits.

In the adding of the additional information bits, additional information bits may consist of an enhanced layer using a Scalable Video Coding is added to the recovered basic information bits.

In another aspect, there is provided a signal processing method for allowing a terrestrial repeater to transmit a signal received from a satellite to a terminal, the method including: at the satellite, receiving a modulated signal which is modulated in the form of a Quadrature Phase Shift Keying (QPSK) symbol including basic information bits; at the satellite, transmitting a modulated signal which is modulated in the form of a QPSK symbol including the basic information bits to the terminal or the terrestrial repeater; at the terrestrial repeater, generating a signal which is modulated in the form of a 16-Quadrature Amplitude Modulation (16-QAM) symbol including the basic information bits, which are recovered from the modulated signal received from the satellite, and additional information bits and then transmitting the generated signal; and at the terminal, recovering information by combining or selecting the signal that is received from the satellite or the signal that is received from the terrestrial repeater.

In a satellite system, a signal transmitted to a satellite or transmitted to a satellite is subject to a low order modulation.

In a satellite system, a terrestrial repeater performs a high order modulation and thus the efficiency of spectrum is enhanced.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
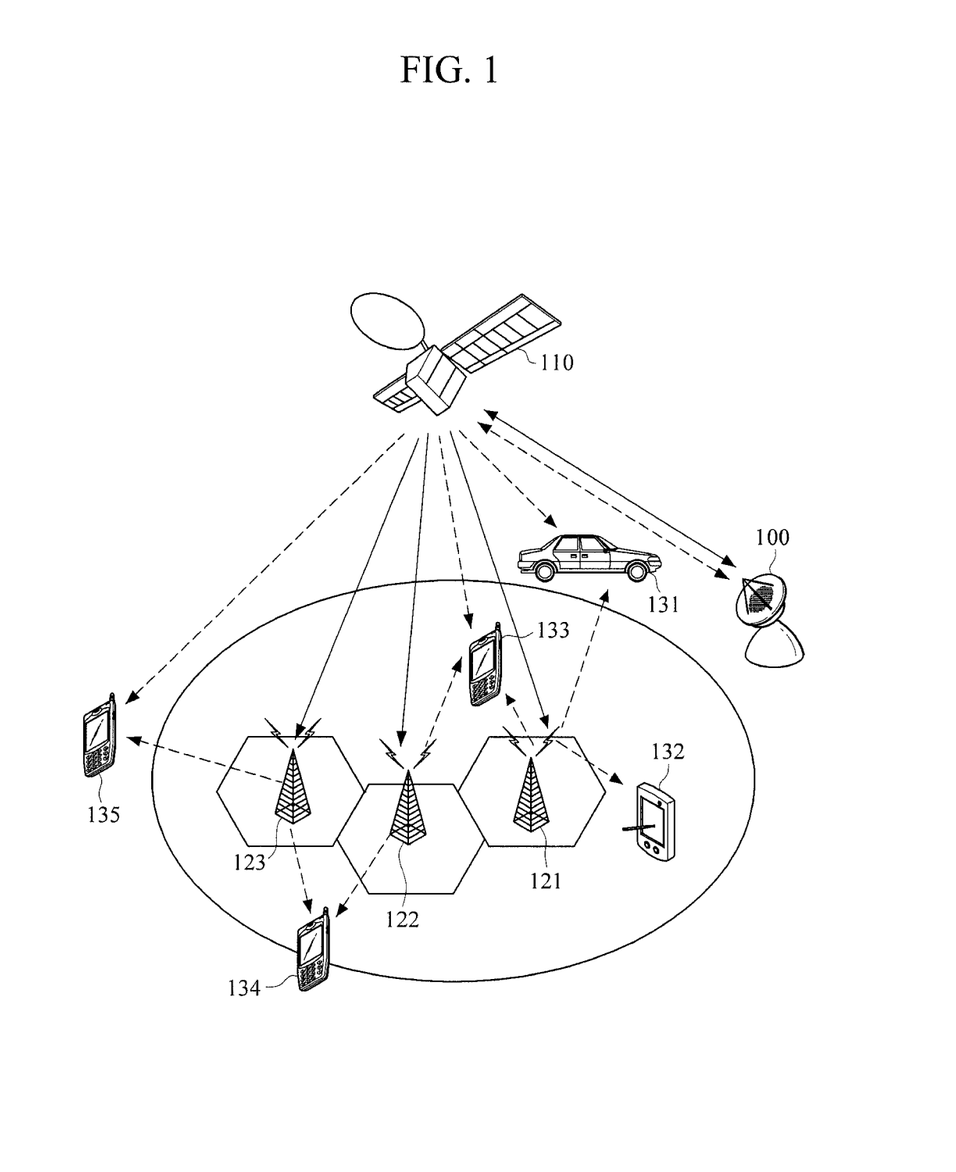
FIG. 1 shows an example of a system in which a satellite signal is retransmitted from a repeater to a terminal.

FIG. 1 shows an example of a system in which a satellite signal is retransmitted from a repeater to a terminal.

Referring to FIG. 1, a satellite system includes a satellite gateway 100, a satellite 110, repeaters 121 to 123, and terminals 131 to 135.

The satellite gateway 100 sends the satellite 110 a signal for services that are provided to the terminal on the ground.

In response to the reception of the signal, the satellite 110 broadcasts the signal to the ground. The signal received from the satellite 110 reaches to the repeaters 121 to 123 and the terminals 131 and 135.

The repeaters 121 to 123 amplifiers or converts the received signal and then retransmits the signal to the terminals 131 to 135. In FIG. 1, the repeater 121 transmits signals to the terminals 131, 132 and 133, the repeater 122 transmits signals to the terminals 133 and 134, and the repeater 123 transmits signals to the terminals 134 and 135.

As described above, the terminals 131 to 135 provides services by receiving signals from the satellite 110 and/or at least one of the repeaters 121 to 123.

Figure 2:
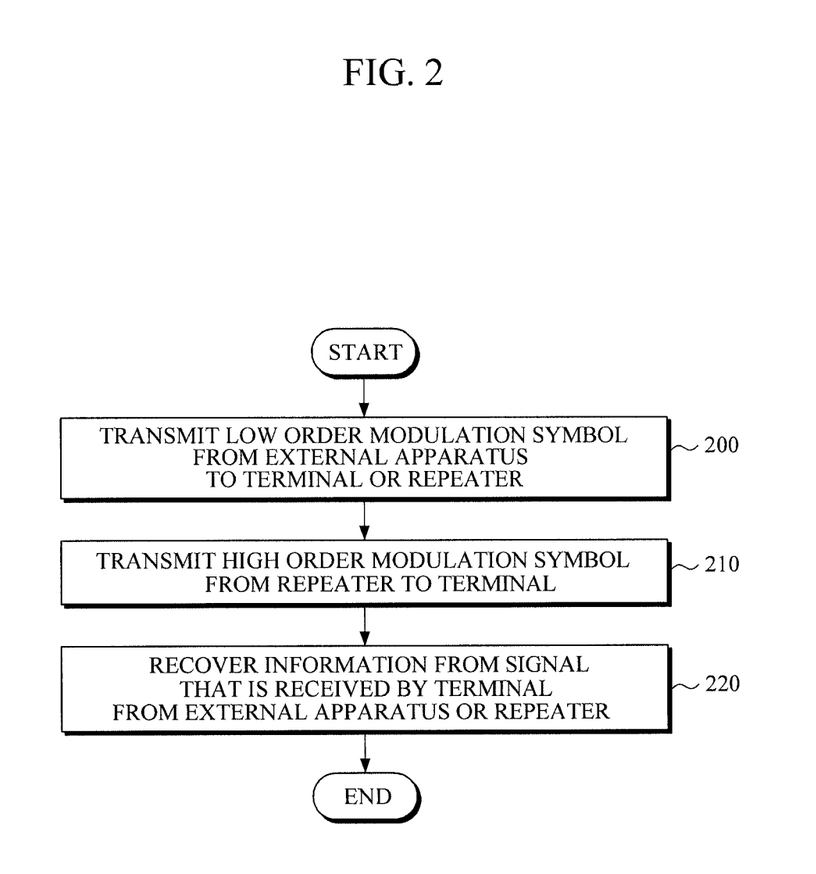
FIG. 2 shows an example of the control flow of a signal processing procedure through a repeater.

FIG. 2 shows an example of the control flow of a signal processing procedure through a repeater.

A method for allowing a repeater to transmit a signal received from an external apparatus to a terminal is as follows. First, an external apparatus transmits a modulated signal, which is modulated in the form of a low order modulation symbol including a basic information bit, to a terminal or a repeater (200).

Thereafter, the repeater generates a modulated signal, which is modulated in the form of a high order modulation symbol including the basic information bit, which is recovered from the modulated signal received from the external apparatus, and an additional information bit, and transmits the generated signal to the terminal (210).

Finally, the terminal recovers the basic information bit and the additional information bit by combining or selecting the signal that is received from the external apparatus or the signal that is received from the repeater, so that the terminal implements a desired service (220).

The basic information bit used in operation 220 may include error correction coded bits. In this case, the basic information bit may include systematic information (s) and some parity information (pi) using code rate compatible-error correction coding.

The code rate compatible-error correction code represents a code that is designed to transmit information by only using systematic information (s) and some parity information of mother code including systematic information (s) and the whole parity information (p1, p2, . . . , and pN) and to decode the original information based on the systematic information (s) and the some parity information.

The error correction coding is provided to correct data error that may occur when data is transmitted in a wireless communication system and a mobile communication system. This example is focused on the usage of signals through the error correction coding technology rather than the error correction coding itself. Accordingly, detailed description of the error correction coding will be omitted.

In addition, if the basic information bit used in operation 200 is an image information, in particular, an image information implemented using a Scalable Video Coding, the basic information bits may only include information about a basic layer.

The SVC is a technology of converting a format such that a content is adaptably used according to the type of services. For example, in general, in order to use a content, which is created for a high definition television, on a personal terminal of a portable multimedia player (PMP), the content requires an additional encoding. However, the SVC allows a content to be used both in a Standard-Definition Television (SDTV) and a digital multimedia broadcasting (DMB) in addition to HDTV. The SVC technology is implemented by use of a Spatial Scalability and a Temporal Scalability.

The SVC is also an advanced coding technology for providing the optimum quality of services to various terminals in various network environment when providing intelligent broadcast contents in a convergence environment of broadcasting and telecommunication, and the example is focused on the usage of signals through the SVC technology. Accordingly, detailed description thereof will be omitted.

Figure 3:
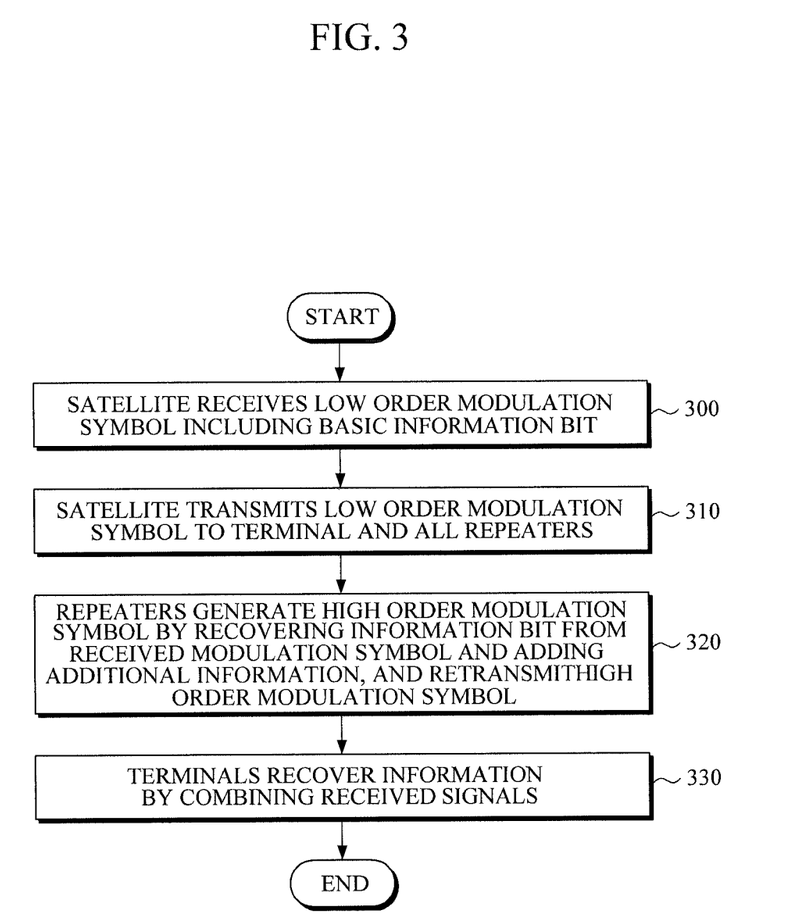
FIG. 3 shows an example of a signal processing procedure that is applied to a satellite system.

FIG. 3 shows an example of a signal processing procedure that is applied to a satellite system, that is, the signal processing process of FIG. 3 is achieved on the satellite system shown in FIG. 1.

The satellite gateway 100 transmits a signal, which is provided in the form of a low order modulation symbol including basic information bit, to the satellite 110 (300).

The satellite 110 transmits the signal received from the satellite gate 100 to the terminals 131 to 135 and the repeaters 121 to 123 (310).

The repeaters 121 to 123 demodulate the modulated symbol, which is received from the satellite 110, to recover bit information and then adding additional information to the recovered bit information to convert the received symbol to a high order modulation symbol and finally retransmits the high order modulation symbol (320). The repeaters 121 to 123 may perform the above described signal processing, so there may be a time delay due to a difference in time between the signal directly transmitted from the satellite to the terminal and the signal transmitted from the repeater to the terminal. Accordingly, a delay compensation may be performed.

The terminals 131 to 135 recover information by combining or selecting signals each having the maximum reception among the signals that are received from the satellite 110 in operation 310 and the signals that are received from the repeaters 121 to 123 in operation 320 (330).

In this case, a Soft Demapping is performed according to the highest modulation order of all signals receivable by the terminal. According to the reliability for each soft demapping bit value, a code rate that is used in the error correction decoding may be determined.

Alternatively, when the SVC is used for encoding, according to the reliability of the soft demapping bit value, it is determined whether to recover only basic layer information or enhanced layer information together with basic layer information.

The basic information bit used in operation 300 may include error correction coded bit. In this case, the basic information includes systematic information (s) and some of parity information (pi) using code rate compatible-error correction coding.

If the basic information bit used in operation 300 is image information, in particular, if the basic information bit is image information implemented through the SVC, the basic information bit only include basic layer information. In addition, operation 320 may include following sub-steps. First, transmitted basic information is recovered by demodulating the received modulated symbol. Then, the received symbol is converted to a high order modulation symbol by adding additional information to the recovered information bit and using the additional information without increasing the frequency bandwidth. Thereafter, a delay compensation is performed based on based on propagation delay in comparison with the signal directly transmitted from the satellite 110 to the terminals 131 to 135.

In this case, the additional information may include a predetermined parity information that is not included in the error correction coded bits used in operation 300.

If the additional information is image information implemented through the SVC, the additional information may include information about an enhanced layer to improve the quality of image information.

Alternatively, the additional information may be information obtained by combining a predetermined parity information, which is not included in the error correction coded bits used in operation 300, and information about an enhanced layer used to improve the quality of image information. Hereinafter, signal processing will be described according to each additional information with reference to FIGS. 4 and 5.

Figure 4:
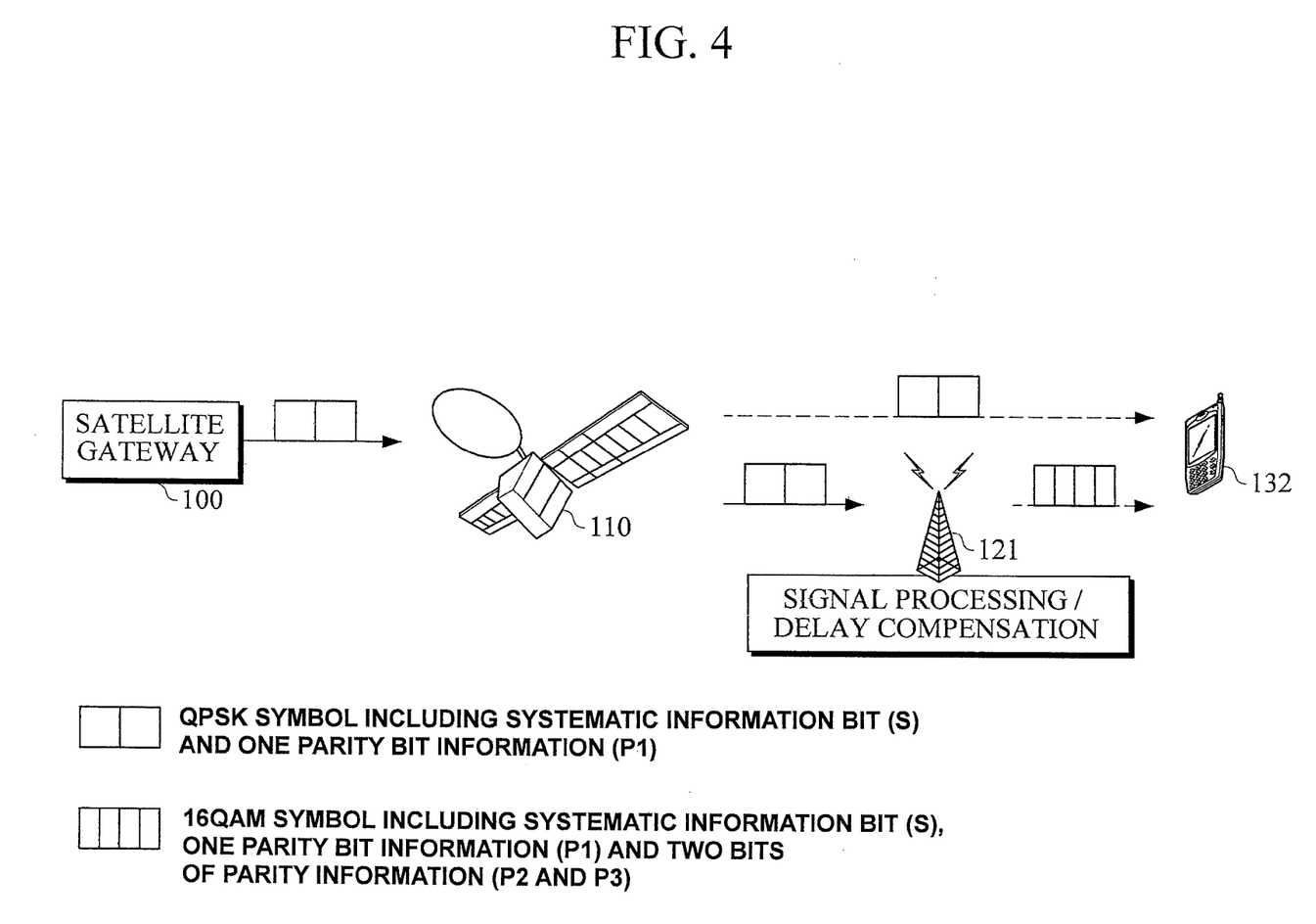
FIG. 4 shows an example of a signal processing procedure that is performed on an error correction coded signal in a satellite system.

FIG. 4 shows an example of a signal processing procedure that is performed on an error correction coded signal in a satellite system.

As shown in FIG. 4, the satellite gateway 100 generates a Quadrature Phase Shift Keying (QPSK) modulation symbol with coding rate 1/2 by use one bit of a single piece of systematic information (s) and one bit of a single piece of parity bit (p1) using code rate compatible-error correction coding, and transmits the generated QPSK modulation symbol.

The QPSK modulation is well known in the art and widely used in digital broadcasting and communication systems. This example is focused on the usage of signals through the QPSK modulation rather than the QPSK modulation itself. Accordingly, detailed description thereof will be omitted.

The repeater 121 generates a 16-Quadrature Amplitude Modulation (16-QAM) symbol consisting of 4 bits by recovering the received QPSK modulation symbol and adding two bits of parity information (p2 and p3), and retransmits the generated 16-QAM symbol to the terminal 132.

The terminal 132 performs a soft demapping on the received signal on the assumption that the received signal is a 16-QAM symbol. In the case of signals received from the repeater, absolute values of average reliabilities of soft decision bit values for four bits forming one symbol are similar. In the following step, a decoding on the error correction code is performed using a code with a coding rate of 1/4. Meanwhile, in the case of signals received from the satellite 110 due to poor reception from the repeater 121 and receptionablity only from the satellite 110, when viewing the absolute value of average reliability of soft decision bit values for the four bits, two of the four bits have significantly low reliability values that those of the remaining two bits. Accordingly, the two bits having significantly low reliability values are deleted, and a decoding on the error correction code may be performed using a code with a coding rate of 1/2.

The 16-QAM is well known in the art. This example is focused on the use of signals using the 16-QAM. Accordingly, detailed description thereof will be omitted.

Figure 5:
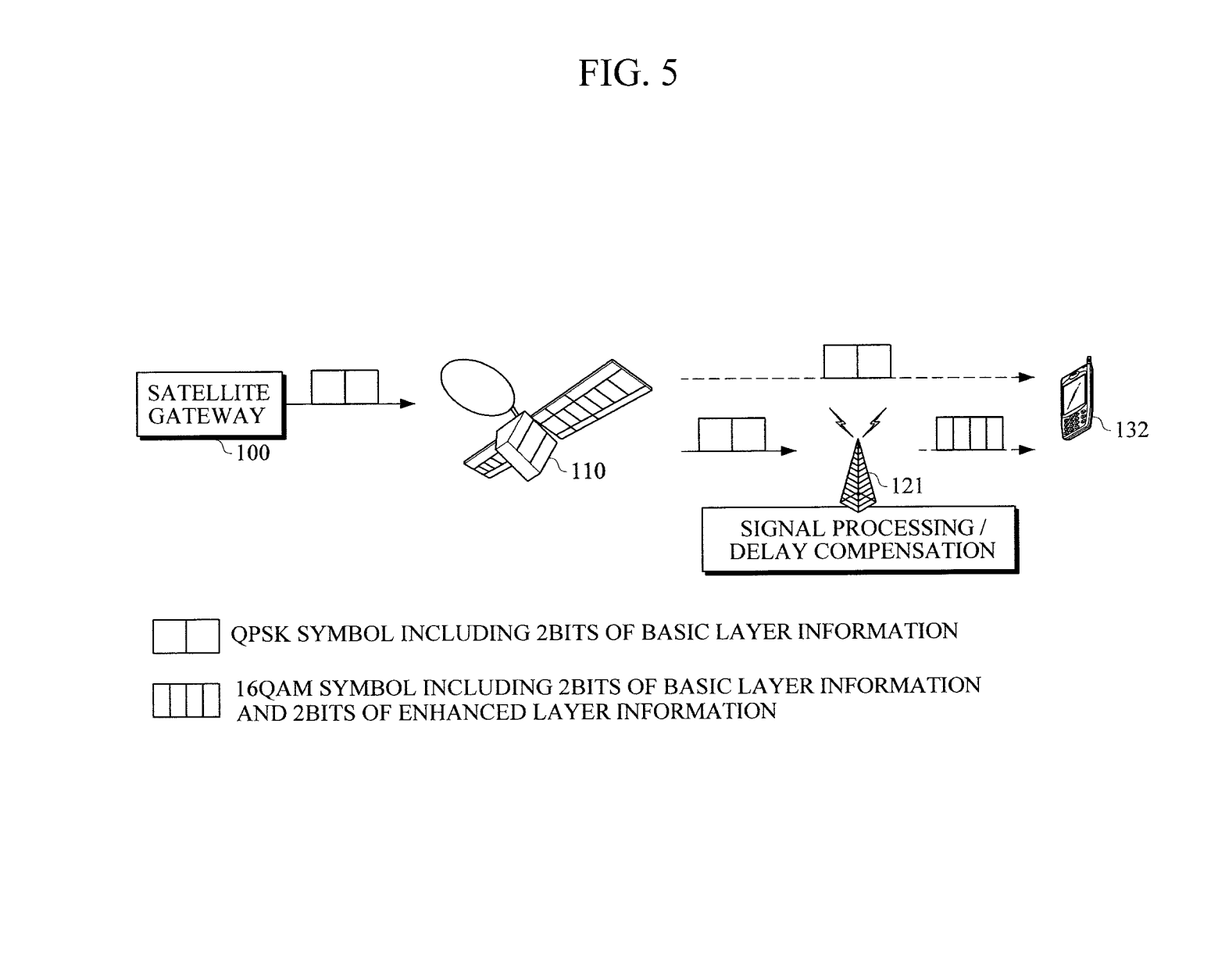
FIG. 5 shows another example of a signal processing procedure that is performed on a scalable video coded signal in a satellite system.

FIG. 5 shows another example of a signal processing procedure that is performed on a scalable video coded signal in a satellite system.

As shown in FIG. 5, when the transmitted information is image information obtained through the SVC, basic information bits include only information about a basic layer. Accordingly, information about an enhanced layer may be added such that a high quality of image service is enabled.

As shown in FIG. 5, the satellite 110 transmits a QPSK modulation symbol, which is modulated using 2 bits information of a basic layer, to the repeater 121. The repeater 121 generates a 16-QAM modulation symbol by modulating the received QPSK modulation and adding additional 2 bits information, and transmits the generated 16-QAM modulation symbol to the terminal 132.

In this manner, signals having additional information can be transmitted without the need to increase the frequency bandwidth. In addition, since the signal transmitted from the repeater 121 is received with a power greater than that of the signal directly received from the satellite 110, all information bits included in the 16-QAM symbol are recovered such that a high quality of service can be provided.

In addition, if the terminal 132 receives signals only from the satellite 110 or has a weak reception with respect to the repeater 121, the signals are demodulated to the QPSK and information bit of only the basic layer is recovered for use.

Figure 6:
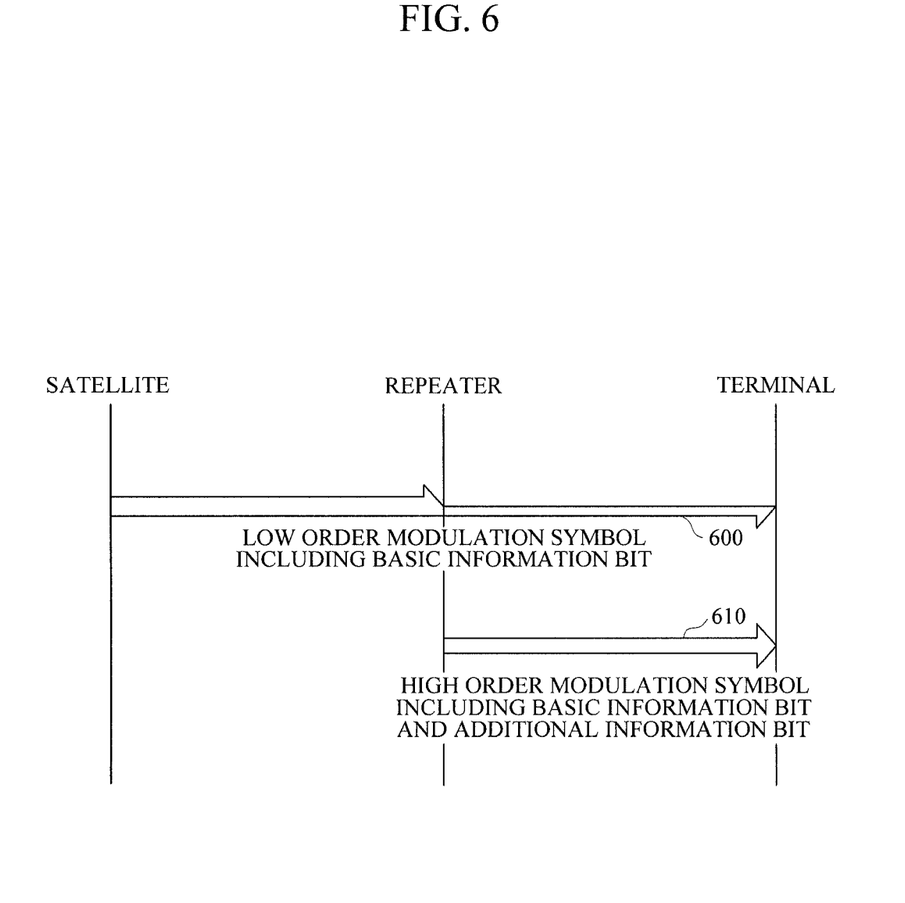
FIG. 6 shows characteristics of a signal that is received by a terminal in an example of a satellite system.

FIG. 6 shows characteristics of a signal that is received by a terminal in an example of a satellite system.

When the repeater recovers basic information and adds additional information as shown in FIGS. 4 and 5, additional parity information (see FIG. 4) or information about the enhanced layer (see FIG. 5) may be combined and added to the recovered basic information.

The terminal performs a soft demapping on the received signals on the assumption that the received signal is a 16-QAM symbol. If the terminal receives a low order modulation symbol only including basic information bits from the satellite (600), or has a low reception with respect to the repeater (600), when viewing average reliability of soft decision bit values for four bits, two of the four bits have significantly low reliability values that those of the remaining two bits. Accordingly, the two bits having significantly low reliability values are deleted, and only information bit of a basic layer is recovered.

If the terminal receives a high order modulation symbol including basic information bit and additional information bit (610), absolute values of reliability averages of soft-decision bit values for four bits forming one symbol may be similar. In this case, the information bit corresponding the basic layer and the information bit corresponding to the enhanced layer are recovered.

As described above, the terminal can receive signals from both of the satellite and the repeater, so the terminal recovers required information by use of proper modulation scheme based on the state of received signals. Accordingly, a seamless service is ensued even in a poor reception environment, such as an urban area in which satellite signals are not directly received due to the high skyscraper causing a shadow area.

The disclosure can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network coupled computer systems so that the computer readable code is stored and executed in a distributed fashion.

Also, functional programs, codes, and code segments for accomplishing the present invention can be easily construed by programmers skilled in the art to which the present invention pertains. A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A signal processing method for allowing a repeater to transmit a signal received from an external apparatus to a terminal, the method comprising:

at the external apparatus, transmitting a modulated signal, which is modulated in the form of a low order modulation symbol including basic information bits, to the terminal or the repeater;

at the repeater, generating a second modulated signal, which is modulated in the form of a high order modulation symbol including the basic information bits, which is recovered from the modulated signal received from the external apparatus, and additional information bits and transmitting the generated signal to the terminal; and at the terminal, recovering information by combining or selecting the signal received from the external apparatus or the signal received from the repeater, wherein the recovering of the information bits comprises:
performing a soft decision bit demodulation based on a highest modulation order of all signals received by the terminal; and
determining information bits, which is to be recovered, according to a relative difference between soft decision bit values that are obtained through the soft decision bit demodulation.

2. The method of claim 1, further comprising:
at the external apparatus, receiving the modulated signal, which is modulated in the form of a low order modulation symbol including basic information bits.

3. The method of claim 1, wherein in the transmitting of the modulated signal from the external apparatus to the terminal or the repeater,
the external apparatus transmits the modulated signal, which is modulated in the form of a low order modulation symbol including basic information bits comprising systematic information (s) and some parity information (pi) using an error correction code.

4. The method of claim 1, wherein in the transmitting of the modulated signal from the external apparatus to the terminal or the repeater,
the external apparatus transmits a modulated signal, which is modulated in the form of a low order modulation symbol including basic information bits comprising a basic layer using a Scalable Video Coding (SVC).

5. The method of claim 1, wherein the transmitting of the generated signal from the repeater to the terminal comprises:
recovering the basic information bits by demodulating the signal that is received from the external apparatus;
adding the additional information bits to the recovered basic information bits; and
generating the second modulated signal, which is modulated in the form of a high order modulation symbol including the basic information bits and the additional information bits.

6. The method of claim 5, wherein the transmitting of the generated signal from the repeater to the terminal further comprises:
performing a delay compensation processing on the generated signal based on propagation delay in comparison with a signal transmitted from the external apparatus.

7. The method of claim 5, wherein in the adding of the additional information bits, additional information bits consisting of a predetermined parity information (p) using an error correction code is added to the recovered basic information bits.

8. The method of claim 5, wherein in the adding of the additional information bits, additional information bits consisting of an enhanced layer using a Scalable Video Coding is added to the recovered basic information bits.

9. The method of claim 1, wherein the determining of information bits comprises:
investigating absolute values of average reliabilities of the soft decision bit values that forms a symbol; and
omitting or deleting a bit value having an absolute value of average reliability below a predetermined threshold value by performing comparison on the absolute values of average reliabilities among the soft decision bit values.

10. A signal processing method for allowing a terrestrial repeater to transmit a signal received from a satellite to a terminal, the method comprising:
at the satellite, receiving a modulated signal which is modulated in the form of a Quadrature Phase Shift Keying (QPSK) symbol including basic information bits;
at the satellite, transmitting the modulated signal which is modulated in the form of a QPSK symbol including the basic information bits to the terminal or the terrestrial repeater;
at the terrestrial repeater, generating a second signal which is modulated in the form of a 16-Quadrature Amplitude Modulation (16-QAM) symbol including the basic information bits, which are recovered from the modulated signal received from the satellite, and additional information bits and then transmitting the generated signal; and
at the terminal, recovering information by combining or selecting the signal that is received from the satellite or the signal that is received from the terrestrial repeater,
wherein the recovering of the information bits comprises:
performing a soft decision bit demodulation based on a highest modulation order of all signals received by the terminal; and
determining information bits, which is to be recovered, according to a relative difference between soft decision bit values that are obtained through the soft decision bit demodulation.

11. The method of claim 10, wherein in the transmitting of the modulated signal from the satellite to the terminal or the terrestrial repeater,
the satellite transmits the modulated signal, which is modulated in the form of a QPSK symbol including basic information bits comprising systematic information (s) and some parity information (pi) using an error correction code.

12. The method of claim 11, wherein in the transmitting of the modulated signal from the terrestrial repeater to the terminal,
generating the second modulated signal which is modulated in the form of a 16-QAM symbol including basic information bits, which comprises systematic information (s) and some parity information (pi) using the error correction code, and additional information bits which comprises a predetermined parity information (pi).

13. The method of claim 10, wherein in the transmitting of the modulated signal from the satellite to the terminal or the terrestrial repeater,
the satellites transmits the modulated signal which is modulated in the form of a QPSK symbol including basic information bits consisting of a basic layer using a Scalable Video Coding (SVC).

14. The method of claim 13, wherein the transmitting of the generated signal from the terrestrial repeater to the terminal comprising:
generating the second modulated signal which is modulated in the form of a 16-QAM symbol including basic information bits consisting of a basic layer using the Scalable video coding and additional information bits consisting of an enhanced layer using the Scalable video coding.

* * * * *